United States Patent [19]

Müller et al.

[11] 3,793,901

[45] Feb. 26, 1974

[54] SHIFTING MECHANISM FOR AUTOMATIC TRANSMISSIONS OF VEHICLES

[75] Inventors: Robert Müller, Korntal; Karl Sommerer, Stuttgart-Zuffenhausen, both of Germany

[73] Assignee: Dr. Ing. h.c.F. Porsche KG, Stuttgart-Zuffenohusen, Germany

[22] Filed: Oct. 13, 1971

[21] Appl. No.: 188,875

[30] Foreign Application Priority Data
Oct. 14, 1970 Germany.............................. 2050395

[52] U.S. Cl................... 74/473 R, 74/476, 192/4 A
[51] Int. Cl......................... G05g 9/12, F16h 57/06
[58] Field of Search...... 74/473 R, 473 P, 475, 476, 74/477; 192/4 A

[56] References Cited
UNITED STATES PATENTS
2,775,134  12/1956  Swenson........................... 74/477 X
2,964,964  12/1960  Craig................................. 74/473 R
3,323,609  6/1967   Rosenberger et al............. 74/473 R FOREIGN PATENTS OR APPLICATIONS
913,859  6/1954  Germany

*Primary Examiner*—Allan D. Herrmann
*Attorney, Agent, or Firm*—Craig and Antonelli

[57] ABSTRACT

A shifting mechanism for automatic change-speed transmissions of vehicles in which an actuating lever is connected with a shifting linkage and serves for the selection of the individual drive speeds by the use of a template of essentially Y-shape, within which the actuating lever is guided; the park and reverse speed positions are thereby arranged on opposite sides of the remaining shifting positions for the forward drive and the neutral position arranged therebetween.

17 Claims, 3 Drawing Figures

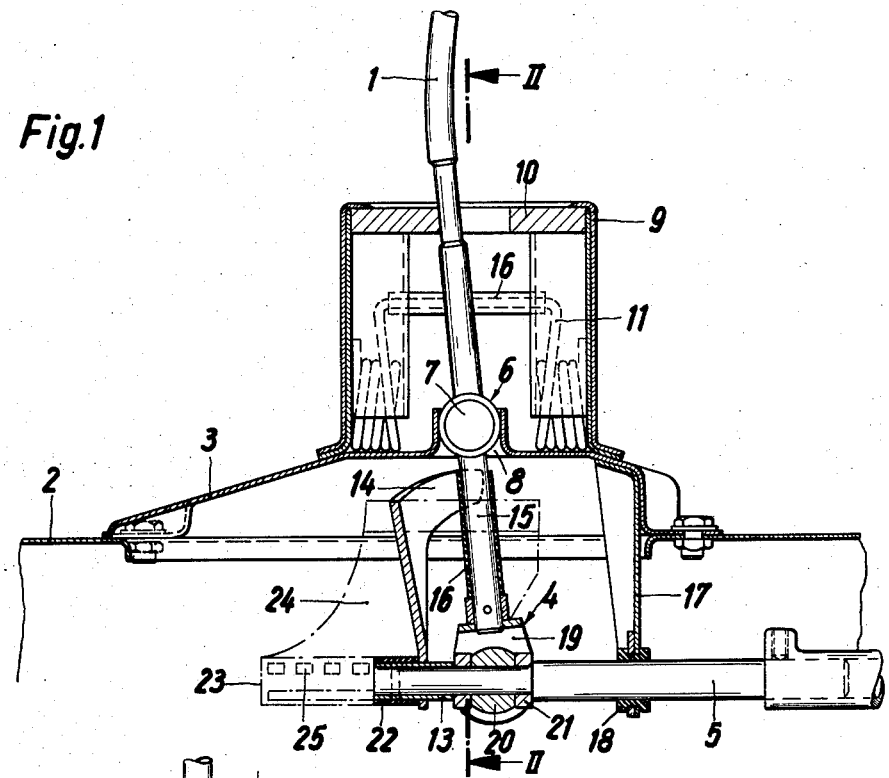
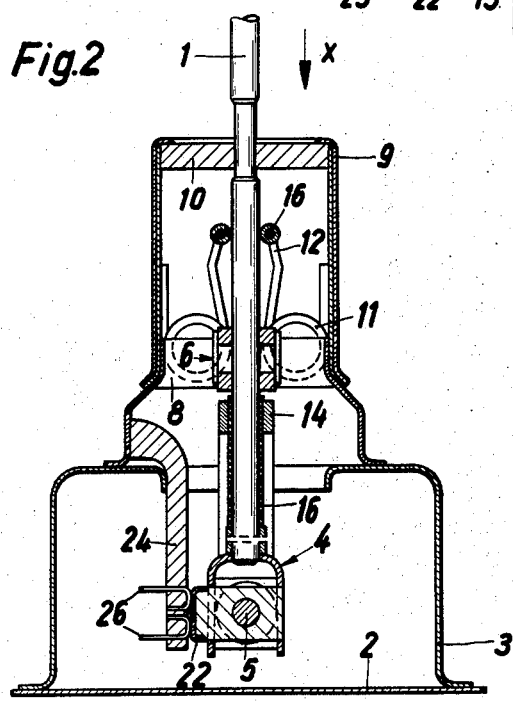
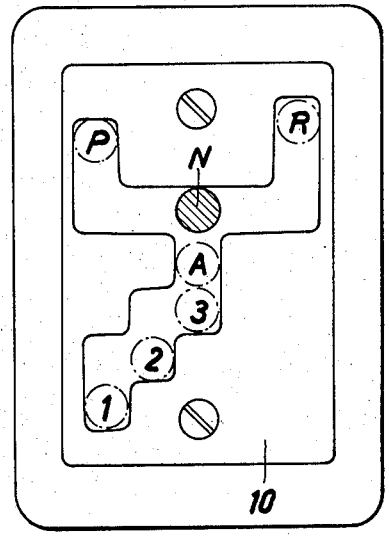

SHIFTING MECHANISM FOR AUTOMATIC TRANSMISSIONS OF VEHICLES

The present invention relates to a shifting mechanism for automatic change-speed transmissions of vehicle, which includes an actuating lever that is connected with a shifting linkage and serves for the selection of the individual driving speeds, and in which the driving speed adjustment of the actuating lever takes place by the use of a template.

Shifting mechanisms for automatic change-speed transmissions of vehicles must be so constructed that they can be manufactured in a simple and cost-saving manner and that faulty shifting operations are avoided.

Shifting mechanism of the aforementioned type for automatic transmissions are known as such. Thus, the German Offenlegungsschrift No. 1,963,545 discloses an actuating lever which is arranged at a stationary section of the vehicle chassis whereby one end of the actuating lever is mechanically connected with the shifting linkage of the transmission selecting the drive range. The actuating lever includes a rotatable knob by means of which a detent spring can be displaced out of a detent template associated with the respective drive range. This prior art arrangement entails the disadvantage that both the reverse speed and the parking position as well as the individual driving steps can be engaged from neutral position only by rotation of the knob, i.e., by disengagement of a detent spring from the detent template and that respectively in different selecting directions. This leads readily to confusions, primarily during a turning maneuver of the vehicle in which one has to shift continuously from the reverse speed to the automatic position and vice versa so that the danger of a faulty shifting operation exists.

It is furthermore known in the art to guide the actuating lever in a shifting template (British Pat. No. 1,056,178). The shifting template is provided on both sides of the actuating lever with step-shaped recesses, into which the actuating lever can be engaged whereby the actuating lever is retained in the desired position by tension springs engaging at the actuating lever. However, in this prior art arrangement the individual speed steps for the forward and reverse drive as well as the parking position are arranged in the template in a single plane. This prior art construction entails the disadvantage that during the selection of the speed steps for the forward drive one can easily shift into the speed step of the parking or of the reverse speed position, which leads to serious damages of the transmission. Additionally, owing to the arrangement of detent steps in the template on both sides the selection of the required speed step is made more difficult for the driver and a safe shifting is possible only after a longer period of getting used to the particular arrangement.

The object of the present invention, in contradistinction thereto, consists in providing a shifting mechanism for automatic change-speed transmissions of vehicles, in which the actuating lever is supported vibration-free and is guided in a template preventing with certainty any faulty shifting, and in which the parking lock and the reverse speed can be manually engaged in a mechanical manner by the use of the actuating lever.

The underlying problems are solved according to the present invention in that the actuating lever is guided in a Y-shaped template whose parking and reverse speed positions are arranged on both sides of the remaining shifting positions of the forward drive and the neutral position thereof, disposed therebetween. Appropriately, the actuating lever is supported by a universal joint connected with the shifting linkage and is retained in the shifting template by springy means. Advantageously, the abutment of the actuating lever disposed opposite the joint is constituted by a cylindrical bearing bolt arranged transversely to the axis of the actuating lever, which is guided in a guide groove arranged transversely to the drive direction of the bearing bracket. It is of particular advantage that the elastic support takes place by leg-springs arranged on both sides of the actuating lever between the shifting template and the abutment. A further advantage resides in the fact that the shifting linkage within the area of the joint is connected with an entrainment fork, into which the actuating lever engages between the abutment and the joint in a predetermined position of the actuating lever.

The advantages obtained with the present invention reside in particular in that a shifting mechanism is obtained by the characterized features, in which an erroneous shifting is avoided with certainty and which distinguishes itself by a far-reachingly service-free mounting and retention of the actuating lever in the individual shifting positions. Additionally, a vibration-free as well as play-free shifting and selecting mechanism, easy in its actuation, for automatic change-speed transmissions of vehicles is attained by the bearing support of the actuating lever and of the shifting linkage according to the present invention. By the arrangement of leg springs on both sides of the actuating lever, a far-reachingly vibration-free and service-free support of the actuating lever is obtained with simple means. An automatic control of the transmission, simple in construction, can be realized and manufactured by the use of the entrainment fork of the shifting linkage, in which the parking lock and reverse speed can be engaged manually by mechanical means so that separate shifting means of the transmission can be dispensed with. This arrangement additionally offers the advantage that a parking lock which has been engaged manually, can be released again at any time, i.e., also without the assist of the engine.

These and further objects, features and advantages of the present invention will become more apparent from the following description when taken in connection with the accompanying drawing which shows, for purposes of illustration only, one embodiment in accordance with the present invention and wherein FIG. 1 is a longitudinal, cross-sectional view through a shifting mechanism for an automatic change-speed transmission of vehicles according to the present invention;

FIG. 2 is a cross-sectional view through the bearing support of the actuating lever taken along line II—II of FIG. 1, and FIG. 3 is a plan view on the shifting template of the shifting mechanism in the direction of arrow X of FIG. 2, on an enlarged scale.

Referring now to the drawing wherein like reference numerals are used throughout the various views to designate like parts, the shifting mechanism of the present invention consists of an actuating lever 1 which is retained in a bearing bracket 3 secured at the vehicle frame 2 and is connected by way of a universal joint generally designated by reference numeral 4 with the shifting linkage 5 of an automatic change-speed transmission (not shown). A bearing bolt 7 arranged transversely to the axis of the actuating lever 1 serves as abutment 6 for the actuating lever 1; the bearing bolt 7 is thereby securely connected with the actuating lever 1. The bearing bolt 7, in turn, is guided in a groove 8 of the bearing bracket 3, which extends transversely to the drive direction. At the upper end 9 of the support bracket 3 the actuating lever 1 is guided in a slot-shaped template 10 which is constructed Y-shaped and takes over the guidance of the actuating lever 1 in the various shifting positions P, R, N, A, 3, 2 and 1. The parking and reverse speed positions P and R are thereby arranged on the opposite sides of the neutral position N and of the automatic drive position A. The individual speed positions 3, 2 and 1 are provided step-shaped in the template 10. The shifting positions A, 3, 2 and 1 characterize the forward drive speeds, for example, of a four speed transmission. The position automatic A is thereby the range in which the transmission is automatically shifted from starting to the highest speed depending on the drive resistance of the vehicle. However, if the drive resistance is very differing over longer distances, so that the transmission shifts continuously, the driver can select directly a speed 3, 2 or 1. The automatic control A is thereby disengaged. Leg springs 11 are arranged in the support bracket 3 between the template 10 and the abutment 6 of the actuating lever 1 on both sides of the latter, which abut with their leg portions 12 against the actuating lever 1 and support the same in the drive positions A, 3, 2, 1 as well as in the neutral position N. A U-shaped entrainment or follower member 14 securely connected with the shifting linkage 5 on a bush 13 is arranged between the abutment 6 and the joint 4; the actuating lever 1 engages with its lower end 15 into the entrainment member 14 during the engagement of the parking or reverse speed position P or R of the actuating lever 1 so that the shifting linkage 5 can carry out a rotary movement. In order to attain the greatest possible ease of motion and a far-reaching freedom from servicing, the leg portions 12 of the leg springs 11 as well as the end 15 of thhe actuating lever 1 and the abutment 6 are coated with a slide layer 16 consisting of synthetic resinous material of the class of polyurethane. The shifting linkage 5 is supported in a wall 17 (FIG. 1) of the support bracket 3 within a slide bearing 18 consisting of synthetic resinous material. The slide bearing 18 possesses the shape of an equilateral triangle with arched surfaces. It is possible thereby to construct the bearing place elastically and therewith keep the same far-reachingly free of play. The joint 4 between the actuating lever 1 and the shifting linkage 5 includes a housing 19 made from sheet metal which is securely connected with the actuating lever 1. The joint pin 20 of the joint 4 consists of synthetic resinous material and is rotatably retained on the shifting rod 5 as well as in the joint housing 19. Pressure rings 21 consisting of synthetic resinous material are arranged on the shifting rod 5 on both sides of the joint pin 20, which are kept in their respective position by the sleeve 13 supporting the entrainment member 14. Furthermore, a sliding contact ring 22 is mounted over the sleeve 13. The sliding ring 22 slides on a contact tract 23 which is secured at a wall 24 of the support bracket 3 consisting of insulating material and includes individual contact lugs 25. Each of the contact lugs 25 is connected by way of lines 26 with an adjusting motor (not shown) that undertakes the transmission shifting and clutch actuation, and is short circuited by the sliding ring 22 corresponding to the position of the actuating lever 1 or of the shifting rod 5.

For starting the vehicle the actuating lever 1 is displaced by the driver into the position automatic A whereby the sliding ring 22 of the shifting rod 5 is connected with one of the contact lugs 25 of the adjusting motor. As a result thereof, the transmission is automatically shifted corresponding to the prevailing drive resistance of the vehicle, and more particularly from starting to the highest speed of the vehicle. However, if the drive resistance becomes excessive or if the drive resistance of the vehicle changes frequently during short intervals over a longer travel distance, for example, in mountain drives, then the driver can limit the automatic transmission shifting in that he manually displaces the actuating lever 1 into a drive position corresponding to the road condition, for example, into the speed 2. For that purpose, the actuating lever 1 only has to be forced toward the left as viewed in FIGS. 2 and 3 opposite the drive direction against the spring force of the leg portion 12 of one of the leg springs 11 and has to be engaged into the corresponding steps of the template 10. The leg portion 12 of the leg spring 11 thereby presses the actuating lever 1 against the step of the corresponding speed so that the actuating lever 1 is held in this position in a completely satisfactory manner. Furthermore, the shifting rod 5 is thereby displaced toward the left, as viewed in FIG. 1, by the joint 4, however it is not rotated since a rotary movement is prevented by the joint 4. As a result thereof the automatic control A of the transmission is disengaged and the vehicle now drives the selected speed, and more particularly, for such length of time until the driver again shifts to the drive position automatic A or manually engages a higher or lower speed 1 or 3. This operation is repeated analogously in the other drive positions.

During the engagement, for example, of the reverse speed R, the actuating lever 1 at first has to be disengaged out of the driving step engaged at that instant and displaced in the drive direction of the vehicle up to the neutral position N. In the neutral position N, the lower actuating lever end 15 comes into engagement with the entrainment member 14. During the deflection of the actuating lever 1 into the reverse-speed shifting channel R of the template 10, the shifting rod 5 is thereby rotated by the entrainment member 14 and the reverse speed R is thereby engaged by mechanical means. The sliding ring 22 of the shifting rod 5 is thereby connected with the contact lug 25 corresponding to the reverse speed R. An adjusting motor (not shown) of the change-speed transmission is thereby set into operation by way of the contact lug 25 which causes the clutch to engage. Thereafter, with a corresponding position of the gas pedal, the vehicle is set into motion by way of the torque converter. The engagement of the parking lock P takes place analogously; however, the clutches of the change-speed transmission thereby remain disengaged.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the apended claims.

What we claim is:

1. A shifting mechanism for an automatic change-speed transmission of vehicles; said mechanism comprising:

shifting linkage means including a manually operable shifting lever for selecting respective operating conditions of an automatic transmission of the type having operating conditions corresponding to reverse speed, park, neutral, and at least one forward speed, and fixed template means including a shifting lever guide track for guiding movement of said shifting lever, said guide track including a plurality of spaced lever guide transmission operating positions corresponding to respective operating conditions of said transmission, said guide track being configured with park and reverse speed positions disposed at opposite sides of and offset from any forward speed positions so as to preclude inadvertent movement of said shifting lever between a forward speed position and one of said park and reverse speed positions.

2. A shifting mechanism according to claim 1, wherein said guide track further includes a neutral position disposed between said park and reverse speed positions as well as between said forward speed positions and both of said park and reverse speed positions.

3. A shifting mechanism according to claim 2, wherein said guide track is of a substantially Y-shaped configuration with said park and reverse speed positions disposed at respective arms of the Y and with said forward speed positions disposed on the leg of the Y.

4. A shifting mechanism according to claim 3, wherein said neutral position is arranged at the top of the leg of the Y, and wherein the arms of the Y extend in a step-shaped manner from opposite sides of the top of the leg of the Y.

5. A shifting mechanism according to claim 4, wherein said guide track includes a plurality of forward speed positions disposed in a step-shaped offset manner along the leg of the Y, the uppermost of said forward speed positions corresponding to automatic forward speed operation of said transmission.

6. A shifting mechanism according to claim 5, wherein said forward speed positions include three non-automatic forward speed positions arranged on the leg of the Y below an automatic forward speed position.

7. A shifting mechanism according to claim 10, wherein said shifting linkage means includes a universal joint means operatively connected to a lower part of said shifting lever.

8. A shifting mechanism for an automatic change-speed transmission of vehicles, said mechanism comprising:

shifting linkage means including a manually operable shifting lever for selecting respective operating conditions of an automatic transmission of the type having operating conditions corresponding to reverse speed, park, neutral, and at least one forward speed, template means including a shifting lever guide track for guiding movement of said shifting lever, said guide track including a plurality of spaced lever guide transmission operating positions corresponding to respective operating conditions of said transmission, said guide track being configured with park and reverse speed positions disposed at opposite sides of and offset from any forward speed positions so as to preclude inadvertent movement of said shifting lever between a forward speed positions and one of said park and reverse speed positions, and elastic means engaging with said shifting lever to maintain said shifting lever in each of the respective transmission operating positions of said guide track.

9. A shifting mechanism according to calim 8, wherein said elastic means includes leg springs arranged at opposite sides of the shifting lever and between the template means and the bearing bolt.

10. A shifting mechanism according to claim 1, wherein said template means is a single substantially planar plate member which extends substantially transverse to said shifting lever, said guide track extending through said plate member such that said shifting lever extends through said plate member within said guide track with a free end of said shifting lever on one side of said plate member and the other end of said shifting lever on the other side of said plate member and connected to other parts of said shifting linkage means.

11. A shifting mechanism according to claim 10, wherein said guide track in said plate member includes transmission operating positions corresponding to all respective operating conditions of said transmission.

12. A shifting mechanism accordiing to claim 11, wherein said guide track is of a substantially Y-shaped configuration with said park and reverse speed positions disposed at respective arms of the Y and with said forward speed positions disposed on the leg of the Y.

13. A shifting mechanism for an automatic change-speed transmission of vehicles; said mechanism comprising:

shifting linkage means including a manually operable shifting lever for selecting respective operating conditions of an automatic transmission of the type having operating conditions corresponding to reverse speed, park, neutral, and at least one forward speed, template means including a shifting lever guide track for guiding movement of said shifting lever, said guide track including a plurality of spaced lever guide transmission operating positions corresponding to respective operating conditions of said transmission, said guide track being configured wiith park and reverse speed positions disposed at opposite sides of and offset from any forward speed positions so as to preclude inadvertent movement of said shifting lever between a forward speed position and one of said park and reverse speed positions, and support bracket means, wherein said shifting linkage means includes a universal joint means operatively connected to a lower part of said shifting lever, and wherein said shifting linkage means includes an abutment means for the shifting lever arranged intermediate the template means and the universal joint means, said abutment means being formed by a substantially cylindrical bearing bolt extending transverse to the longitudinal extent of said shifting lever, said bearing bolt being guided in a guide groove of said support bracket means.

14. A shift mechansim according to claim 13, further comprising elastic means engaging with said shifting lever to maintain said shifting lever in each of the respective transmission operating positions of said guide track.

15. A shifting mechanism according to claim 14, wherein said elastic means includes leg springs arranged at opposite sides of the shifting lever and between the template means and the bearing bolt.

16. A shifting mechanism according to claim 15, wherein said shifting linkage means includes an entrainment means positioned adjacent said universal joint means, said entrainment means being engageable with said shifting lever at a position intermediate said template means and said universal joint means, said entrainment means being movable with said shifting lever when said shifting lever is moved to said reverse speed and park positions to facilitate shifting of the transmission to reverse speed and park.

17. A shifting mechanism for an automatic change-speed transmission of vehicles; said mechanism comprising:
shifting linkage means including a manually operable shifting lever for selecting respective operating conditions of an automatic transmission of the type having operating conditions corresponding to reverse speed, park, neutral, and at least one forward speed,
and template means including a shifting lever guide track for guiding movement of said shifting lever, said guide track including a plurality of spaced lever guide transmission operating positions corresponding to respective operating conditions of said transmission, said guide track being configured with park and reverse speed positions disposed at opposite sides of and offset from any forward speed positions so as to preclude inadvertent movement of said shifting lever between forward speed position and one of said park and reverse speed positions,
wherein said shifting linkage means includes a universal joint means operatively connected to a lower part of said shifting lever, and wherein said shifting linkage menas includes an entrainment means positioned adjacent said universal joint means, said entrainment means being engageable with said shifting lever at a position intermediate said template means and said universal joint means, said entrainment means being movable with said shifting lever when said shifting lever is moved to said reverse speed and park positions to facilitate shifting of the transmission to reverse speed and park.

* * * * *